United States Patent
Inamura et al.

(10) Patent No.: US 12,339,189 B2
(45) Date of Patent: Jun. 24, 2025

(54) CONTACT DETECTION APPARATUS FOR VEHICLE

(71) Applicant: SUBARU CORPORATION, Tokyo (JP)

(72) Inventors: Keita Inamura, Tokyo (JP); Hayato Aiuchi, Tokyo (JP); Yohei Tsukui, Tokyo (JP); Shiaki Higa, Tokyo (JP); Haruhiko Nagahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 324 days.

(21) Appl. No.: 18/112,771

(22) Filed: Feb. 22, 2023

(65) Prior Publication Data
US 2023/0288277 A1    Sep. 14, 2023

(30) Foreign Application Priority Data
Mar. 8, 2022   (JP) .................. 2022-035480

(51) Int. Cl.
*G01L 7/00* (2006.01)
*B60R 19/48* (2006.01)
*G01L 7/04* (2006.01)

(52) U.S. Cl.
CPC ............ *G01L 7/041* (2013.01); *B60R 19/483* (2013.01)

(58) Field of Classification Search
CPC .............................. G01L 7/041; B60R 19/483
See application file for complete search history.

(56) References Cited

FOREIGN PATENT DOCUMENTS

| JP | 2016-55711 A | 4/2016 | |
|---|---|---|---|
| JP | 2016097935 A | * 5/2016 | ............. B60R 19/18 |

* cited by examiner

*Primary Examiner* — Jamel E Williams
(74) *Attorney, Agent, or Firm* — MCGINN I.P. LAW GROUP, PLLC

(57) ABSTRACT

A contact detection apparatus includes a bumper beam, an absorber, a contact detection sensor, a tube holder, a cover, and first and second protrusions. A pressure tube is held in a groove of the tube holder. The cover is attached to a front end of the tube holder. A pressing member of the cover is disposed inside an opening groove of the groove and in front of the pressure tube. The pressure tube includes first and second protrusions on its outer periphery. The first protrusion projects in a frontward direction, faces the pressing member in frontward and backward directions, and has a pair of upper and lower surfaces inclining in respective directions to come closer to each other as the upper and lower surfaces extend in the frontward direction as seen in a vehicle width direction. The second protrusion is disposed above the first protrusion in an upward direction.

4 Claims, 5 Drawing Sheets

CONTACT DETECTION APPARATUS FOR VEHICLE

CROSS-REFERENCE TO RELATED APPLICATIONS

The present application claims priority from Japanese Patent Application No. 2022-035480 filed on Mar. 8, 2022, the entire contents of which are hereby incorporated by reference.

BACKGROUND

The disclosure relates to a contact detection apparatus for a vehicle. Some vehicles are provided with contact detection sensors. The contact detection sensor is provided on a rear side of a bumper cover of the vehicle. The contact detection sensor detects whether a contact object in contact with the vehicle is a human. For example, Japanese Unexamined Patent Application Publication No. 2016-55711 discloses a structure to which a contact detection sensor for a vehicle is attached. The structure includes a shock absorbing member provided on a front side of a bumper beam. The shock absorbing member has, as a whole, a substantially U-shape that opens backward as seen in a vehicle width direction. The shock absorbing member has a groove on its front portion, and the groove holds a pressure tube therein. When the vehicle makes contact with a human, the pressure tube is compressed in a vertical direction, which causes a deformation of the shock absorbing member. This allows for detection of contact between the vehicle and the human. In contrast, when the vehicle makes contact with a contact object, such as a small animal, other than a human, the shock absorbing member deforms mainly at an upper portion and a lower portion, which suppresses a deformation of the pressure tube. This allows for detection of contact between the vehicle and the contact object other than a human.

SUMMARY

An aspect of the disclosure provides a contact detection apparatus for a vehicle. The contact detection apparatus includes a bumper beam, an absorber, a contact detection sensor, a tube holder, a cover, a first protrusion, and a second protrusion. The bumper beam extends in a width direction of the vehicle. The absorber is disposed in front of and adjacent to the bumper beam and extends in the width direction of the vehicle. The contact detection sensor includes a pressure tube and is configured to output a signal in accordance with a change in pressure of the pressure tube. The pressure tube extends in the width direction of the vehicle and is held by the absorber. The tube holder is a part of a front end of the absorber and has a groove that opens in a frontward direction of the vehicle and holds the pressure tube therein in a rotatable manner. The cover is attached to a front end of the tube holder and includes a body and a pressing member. The body covers a front face of the tube holder. The pressing member extends from the body in a backward direction of the vehicle and is disposed in front of the pressure tube. The first protrusion is provided on an outer periphery of the pressure tube, projects from the pressure tube in the frontward direction of the vehicle, faces the pressing member in the frontward direction and the backward direction of the vehicle, and has a pair of an upper inclined surface and a lower inclined surface. The upper inclined surface and the lower inclined surface incline in respective directions to come closer to each other as the upper inclined surface and the lower inclined surface extend in the frontward direction of the vehicle as seen in the width direction of the vehicle. The second protrusion is provided on the outer periphery of the pressure tube or an inner periphery of the groove, and is disposed above the first protrusion in an upward direction of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
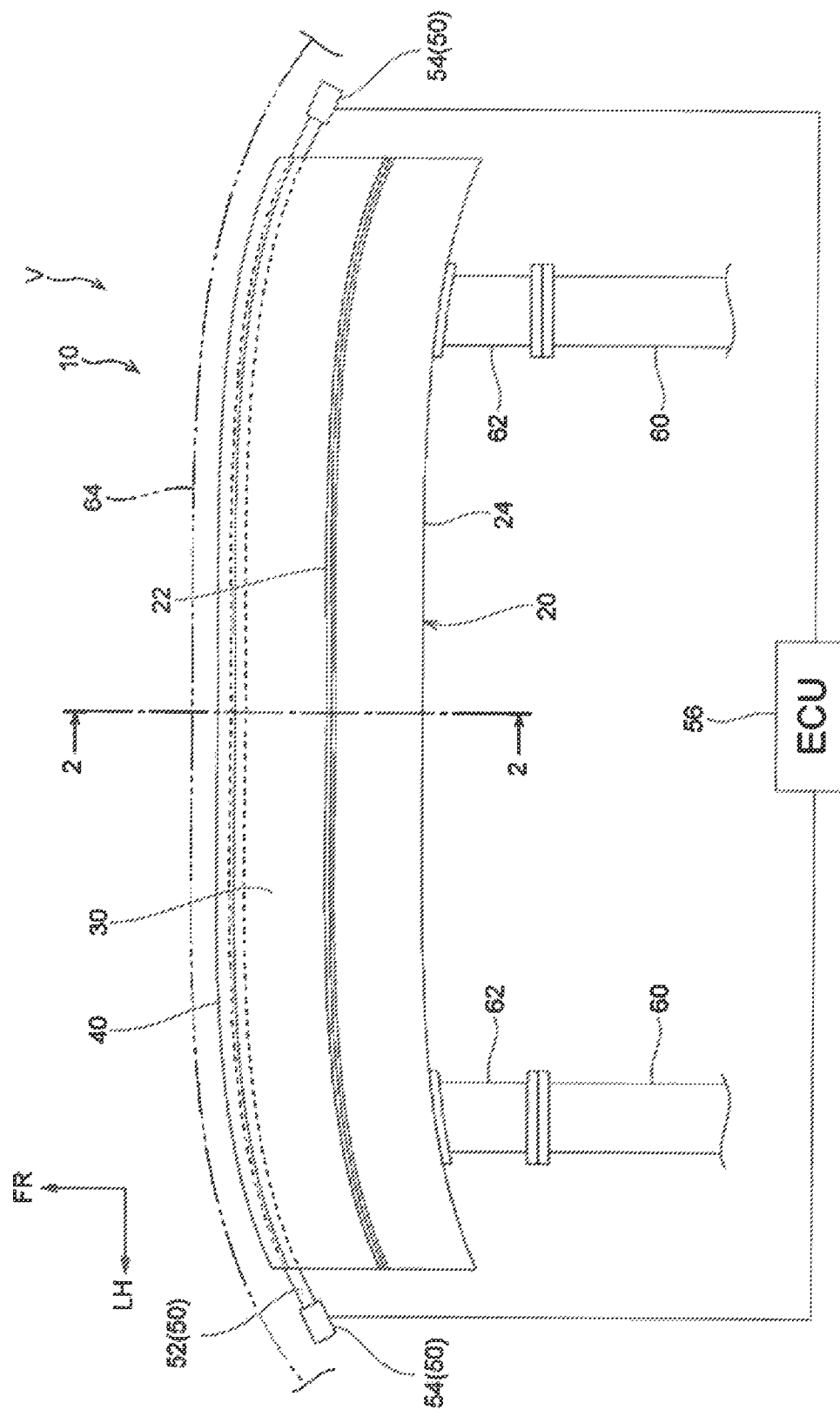
FIG. 1 is a schematic plan view of a contact detection apparatus according to one example embodiment of the disclosure.

When a vehicle makes contact with a human facing in a frontward direction of the vehicle, a bumper cover of the vehicle comes into contact with rear surfaces of the feet of the human, causing the human to bend the feet at the knees. In this case, a contact load inputted from the human to the vehicle is not enough large to appropriately compress a pressure tube in some cases. In such a case, a contact detection apparatus can fail to properly detect whether the contact object in contact with the vehicle is a human.

It is desirable to provide a contact detection apparatus for a vehicle that makes it possible to properly determine whether a contact object in contact with the vehicle is a human.

In the following, a contact detection apparatus 10 according to an example embodiment of the disclosure is described with reference to the accompanying drawings. In these drawings, arrows FR, UP, and LH indicate a frontward direction, an upward direction, and a leftward direction (one-side direction along a vehicle width direction) of a vehicle (e.g., automobile) V to which the contact detection apparatus 10 is applied, respectively. Hereinafter, explanations referring to directions are made on the basis of the upward, downward, frontward, backward, leftward, and rightward directions of the vehicle V unless otherwise noted. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2:
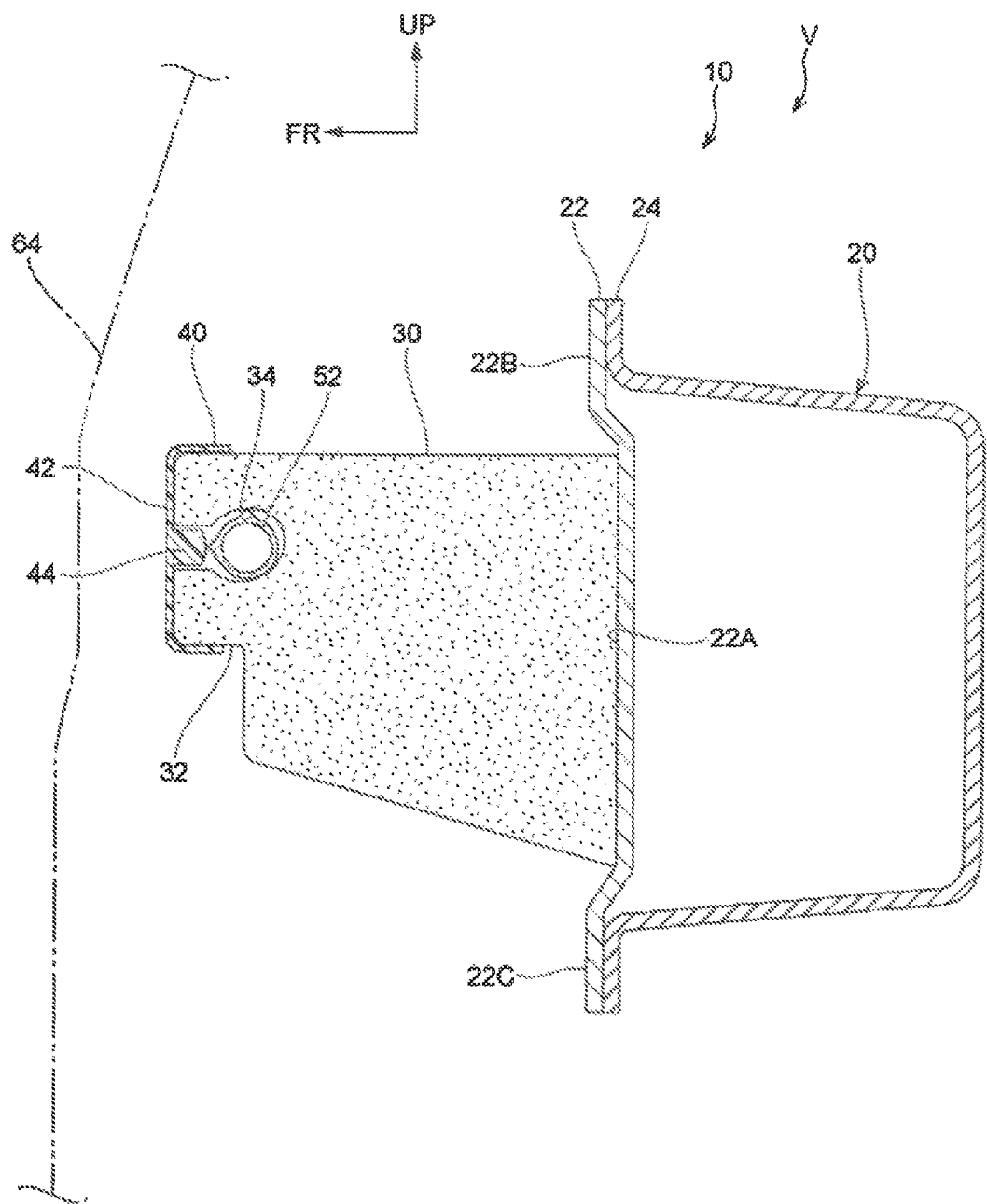
FIG. 2 is an enlarged left cross-sectional view of the contact detection apparatus illustrated in FIG. 1 taken along a line 2-2.

As illustrated in FIGS. 1 and 2, the contact detection apparatus 10 may be provided on a front end of the vehicle V and detect contact of the vehicle V with a contact object. The contact detection apparatus 10 includes a bumper beam 20 which is a structural member of the vehicle V, an absorber 30 provided in front of the bumper beam 20, and a pressing cover 40 attached to the absorber 30. The contact detection apparatus 10 further includes a contact detection sensor 50. Described below are exemplary configurations of these components of the contact detection apparatus 10.

[Bumper Beam 20]

The bumper beam 20 extends in the rightward-leftward direction or a vehicle width direction. The bumper beam 20 may have a substantially rectangular closed cross-sectional shape as seen in a longitudinal direction of the bumper beam 20. The bumper beam 20 may include a front panel 22 which is a front end of the bumper beam 20 and a rear panel 24 which is a rear portion of the bumper beam 20.

The front panel 22 may be a metal plate member having a thickness in the frontward-backward direction and extending in the rightward-leftward direction. The front panel 22 may have a recess 22A in a vertical middle portion of the front panel 22. The recess 22A may be recessed by one step in the backward direction. An upper portion of the front panel 22 above the recess 22A may correspond to a upper flange 22B, and a lower portion of the front panel 22 below the recess 22A may correspond to a lower flange 22C.

Like the front panel 22, the rear panel 24 may be a metal plate member extending in the rightward-leftward direction. The rear panel 24 may have a substantially hat-shape that opens in the frontward direction as seen in a longitudinal direction of the rear panel 24. The rear panel 24 may have an upper end joined to the upper flange 22B of the front panel 22, and a lower end joined to the lower flange 22C of the front panel 22.

Paired front side frames 60 that are structural members of the vehicle V may be provided behind the bumper beam 20. The front side frame 60 may extend in the frontward-backward direction. Opposite ends of the bumper beam 20 in the vehicle width direction may be joined to respective front ends of the front side frames 60 with respective crash boxes 62 interposed therebetween.

[Absorber 30]

The absorber 30 may include a resin foam material such as urethane foam. The absorber 30 may have a substantially elongated shape extending in the rightward-leftward direction or a longitudinal direction, and may be provided in front of and adjacent to the recess 22A of the bumper beam 20. The absorber 30 may have a substantially trapezoidal shape as seen in cross-sectional view in the longitudinal direction. For example, the absorber 30 may have a lower face inclining downward in the backward direction as seen in the rightward-leftward direction. The absorber 30 may have a rear face fixed to a front face of the recess 22A of the bumper beam 20. A bumper cover 64 may be provided in front of the absorber 30. The bumper cover 64 may be a front end of the vehicle V and cover the absorber 30 from in front of the absorber 30.

Figure 3:
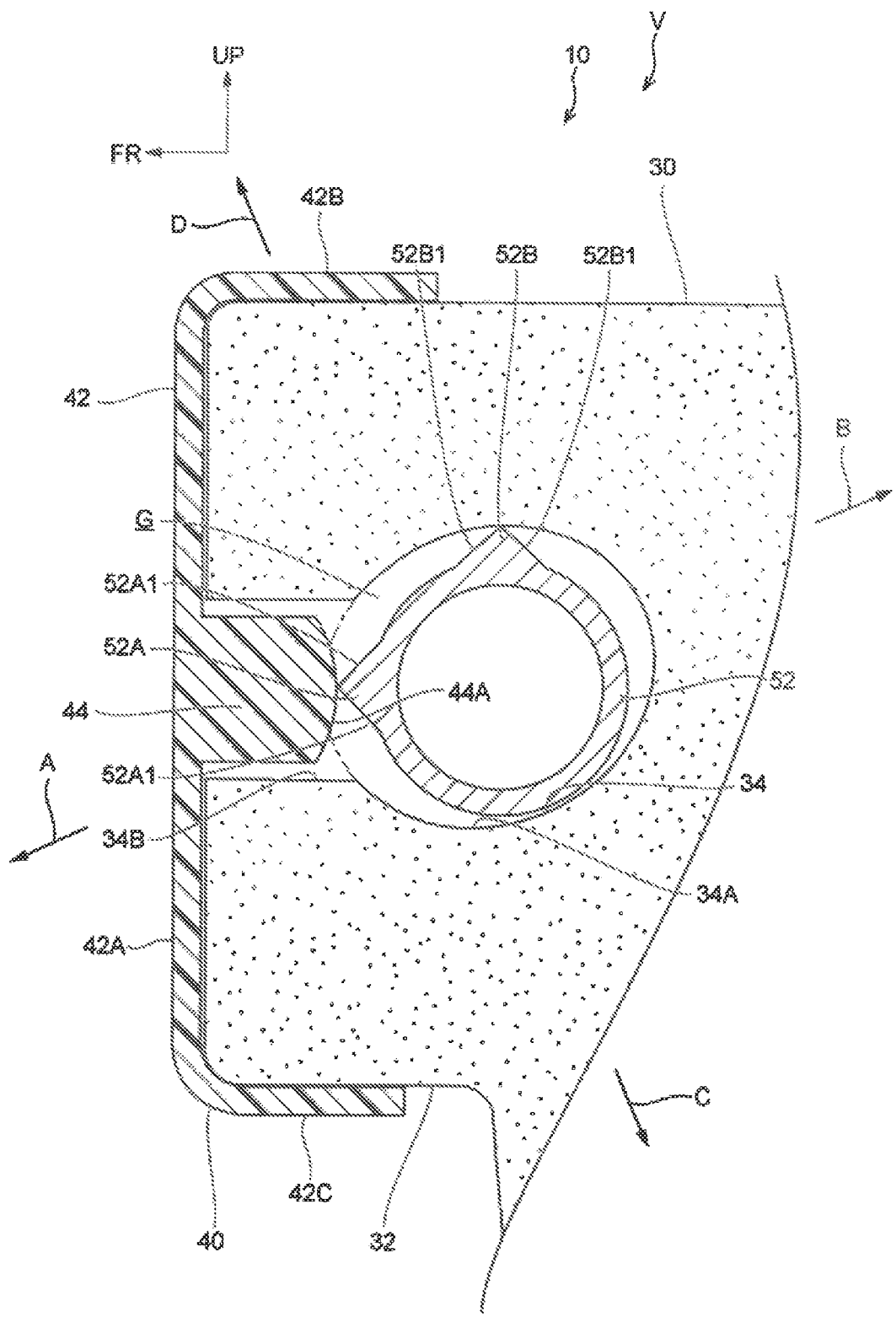
FIG. 3 is an enlarged cross-sectional view of a portion of an absorber including a tube holder illustrated in FIG. 2.

As illustrated in FIG. 3, a tube holder 32 is provided on a front end of the absorber 30. The tube holder 32 holds the pressure tube 52 to be described later, and the pressing cover 40 is attached to the tube holder 32. The tube holder 32 may overhang from an upper end of the absorber 30 in the frontward direction. A groove 34 that opens in the frontward direction may be provided at a vertical middle portion of the tube holder 32. The groove 34 may extend over the entire longitudinal length of the absorber 30. The groove 34 may have a substantially inverted C-shape that opens in the frontward direction in left cross-sectional view. For example, the groove 34 may include a holding groove 34A and an opening groove 34B. The holding groove 34A may be a rear portion of the groove 34 and hold the pressure tube 52 therein. The opening groove 34B may be an opening of the groove 34. The holding groove 34A may have a substantially oval shape as seen in side cross-sectional view. The opening groove 34B may extend in the frontward-backward direction to communicate with the holding groove 34A. The holding groove 34A may have a vertical dimension larger than the width dimension (vertical dimension) of the opening groove 34B. The opening groove 34B may extend from a substantially vertical middle portion of the holding groove 34A in the frontward direction.

[Pressing Cover 40]

The pressing cover 40 may include a resin material. The pressing cover 40 is attached to the tube holder 32 of the absorber 30. The pressing cover 40 includes a cover body 42 and a pressing member 44. In one embodiment, the pressing cover 40 may serve as a "cover". In one embodiment, the cover body 42 may serve as a "body" of the pressing cover 40.

The cover body 42 may have a substantially elongated plate shape extending in the rightward-leftward direction. The cover body 42 may have a substantially U-shape that opens in the backward direction in side cross-sectional view. For example, the cover body 42 may have a front wall 42A having a thickness in the frontward-backward direction, an upper wall 42B extending from an upper end of the front wall 42A in the backward direction, and a lower wall 42C extending from a lower end of the front wall 42A in the backward direction. The cover body 42 may be attached to the tube holder 32 by fitting the cover body 42 into the tube holder 32 from the front such that the tube holder 32 is held between the upper wall 42B and the lower wall 42C that are disposed on the respective ends of the tube holder 32 in the upward-downward direction. In a state where the cover body 42 is attached to the tube holder 32, the front wall 42A may be disposed in front of and adjacent to the tube holder 32.

The pressing member 44 may have a substantially elongated rib shape having a thickness in the upward-downward direction and extending in the rightward-leftward direction. The pressing member 44 may extend in the backward direction from a vertical middle portion of the cover body 42. The pressing member 44 may have a thickness dimension smaller than the width dimension of the opening groove 34B of the absorber 30, and the pressing member 44 may be received in the opening groove 34B. A rear face of the pressing member 44 may serve as a pressing face 44A. The pressing face 44A may be curved into an arc shape that protrudes in the backward direction in side cross-sectional view.

[Contact Detection Sensor 50]

The contact detection sensor 50 includes the pressure tube 52 held by the absorber 30, and a pressure sensor 54 that outputs a signal in accordance with a change in pressure of the pressure tube 52. In a broad sense, the pressure sensor 54 may be regarded as a pressure detector.

The pressure tube 52 may have an elongated shape having a longitudinal length in the rightward-leftward direction. The pressure tube 52 may be a hollow structure having a substantially annular cross-sectional shape. The pressure tube 52 is embedded in the holding groove 34A of the groove 34 and held by the tube holder 32 of the absorber 30 in a rotatable manner. The pressure tube 52 may have a diameter lager than the width dimension of the opening groove 34B.

A first protrusion 52A is provided on an outer periphery of a front end of the pressure tube 52. The first protrusion 52A may have a rib shape extending over the entire longitudinal length of the pressure tube 52 in the vehicle width direction. The first protrusion 52A may have a substantially triangular shape in side cross-sectional view. For example, the first protrusion 52A has a pair of inclined surfaces (i.e., an upper inclined surface and a lower inclined surface) 52A1. The upper and lower inclined surfaces 52A1 incline in respective directions so as to come closer to each other as the upper and lower inclined surfaces 52A1 extend in the frontward direction in side cross-sectional view. That is, the upper and lower inclined surfaces 52A1 incline inward in the upward and downward directions, respectively. An intersection between the inclined surfaces 52A1 may be a front end of the first protrusion 52A, and the first protrusion 52A may be located inside a rear end of the opening groove 34B. For example, the front end of the first protrusion 52A may be located behind and adjacent to a vertical center of the pressing face 44A of the pressing member 44. That is, the first protrusion 52A faces the pressing member 44 in the frontward and backward directions. Hereinafter, the position of the pressure tube 52 in this state may be referred to as an initial position.

Although described in detail below, upon frontal contact between the vehicle and a human, the first protrusion 52A may be pressed by the pressing face 44A of the pressing member 44, which rotates the pressure tube 52 from the initial position to a first position (illustrated in FIG. 4) in a counterclockwise direction as seen from the left side. In contrast, upon frontal contact between the vehicle and a contact object other than a human, the first protrusion 52A may be pressed by the pressing face 44A of the pressing member 44, which rotates the pressure tube 52 from the initial position to a second position (illustrated in FIG. 5) in a clockwise direction as seen from the left side.

A second protrusion 52B is disposed on an outer periphery of an upper end of the pressure tube 52. The second protrusion 52B may have a rib shape extending over the entire longitudinal length of the pressure tube 52 in the vehicle width direction. Like the first protrusion 52A, the second protrusion 52B may have a substantially triangular shape in side-cross-sectional view. For example, the second protrusion 52B may have a pair of inclined surfaces (i.e., a front inclined surface and a rear inclined surface) 52B1, and the front and rear inclined surfaces 52B1 may incline in respective directions so as to come closer to each other as the front and rear inclined surfaces 52B 1 extend in the upward direction in side cross-sectional view. That is, the front and rear inclined surfaces 52B1 may incline inward in the frontward and backward directions, respectively.

The holding groove 34A described above may have a substantially oval shape, which allows the pressure tube 52 to move between the first position and the second position. For example, the holding groove 34A may have an oval shape having a major axis that inclines slightly upward in the backward direction (e.g., along inclination directions indicated by arrows A and B in FIG. 3) and a minor axis extending perpendicular to the inclination direction (e.g., along perpendicular directions indicated by arrows C and D in FIG. 3). The pressure tube 52 may be disposed inside the holding groove 34A such that part of an inner periphery of the holding groove 34A facing in one of the perpendicular directions (e.g., the direction indicated by the arrow C in FIG. 3) is in contact with the outer periphery of the pressure tube 52. The holding groove 34A and the pressure tube 52 may define a gap G therebetween. The first protrusion 52A and the second protrusion 52B may be disposed in the gap G, and a tip of the second protrusion 52B may be in contact with the inner periphery of the holding groove 34A. The gap G may be formed at least on both sides of the first protrusion 52A in the upward and downward directions. The gap G helps to prevent the first protrusion 52A from interfering with an inner periphery of the holding groove 34A while the pressure tube 52 is rotating from the initial position to the first position or the second position.

The pressure sensor 54 may be provided at each of opposite longitudinal ends of the pressure tube 52, and may be fixed to the body of the vehicle V at a non-illustrated position. The pressure sensor 54 may be electrically coupled to an ECU 56. In a broad sense, the ECU 56 may be regarded as a contact determination unit. When the pressure tube 52 deforms, the pressure sensor 54 may output a signal to the ECU 56 in accordance with a change in pressure inside the pressure tube 52.

On the basis of the signal outputted from the pressure sensor 54, the ECU 56 may calculate a value of the change in pressure inside the pressure tube 52, determine whether the value of the change in pressure is greater than a threshold, and determine whether a contact object in contact with the bumper cover 64 is a human or a contact object, such as a small animal, other than a human. For example, in a case where the value of the change in pressure inside the pressure tube 52 is greater than or equal to the threshold, the ECU 56 may determine that the contact object is a human, whereas in a case where the value of the change in pressure inside the pressure tube 52 is less than the threshold, the ECU 56 may determine that the contact object is an object other than a human.

Workings and Effects

Now, workings and effects of the example embodiment of the disclosure are described together with exemplary operations of the contact detection apparatus 10 at the time of frontal contact between the vehicle V and a human and frontal contact between the vehicle V and a contact object other than a human.

Figure 4:
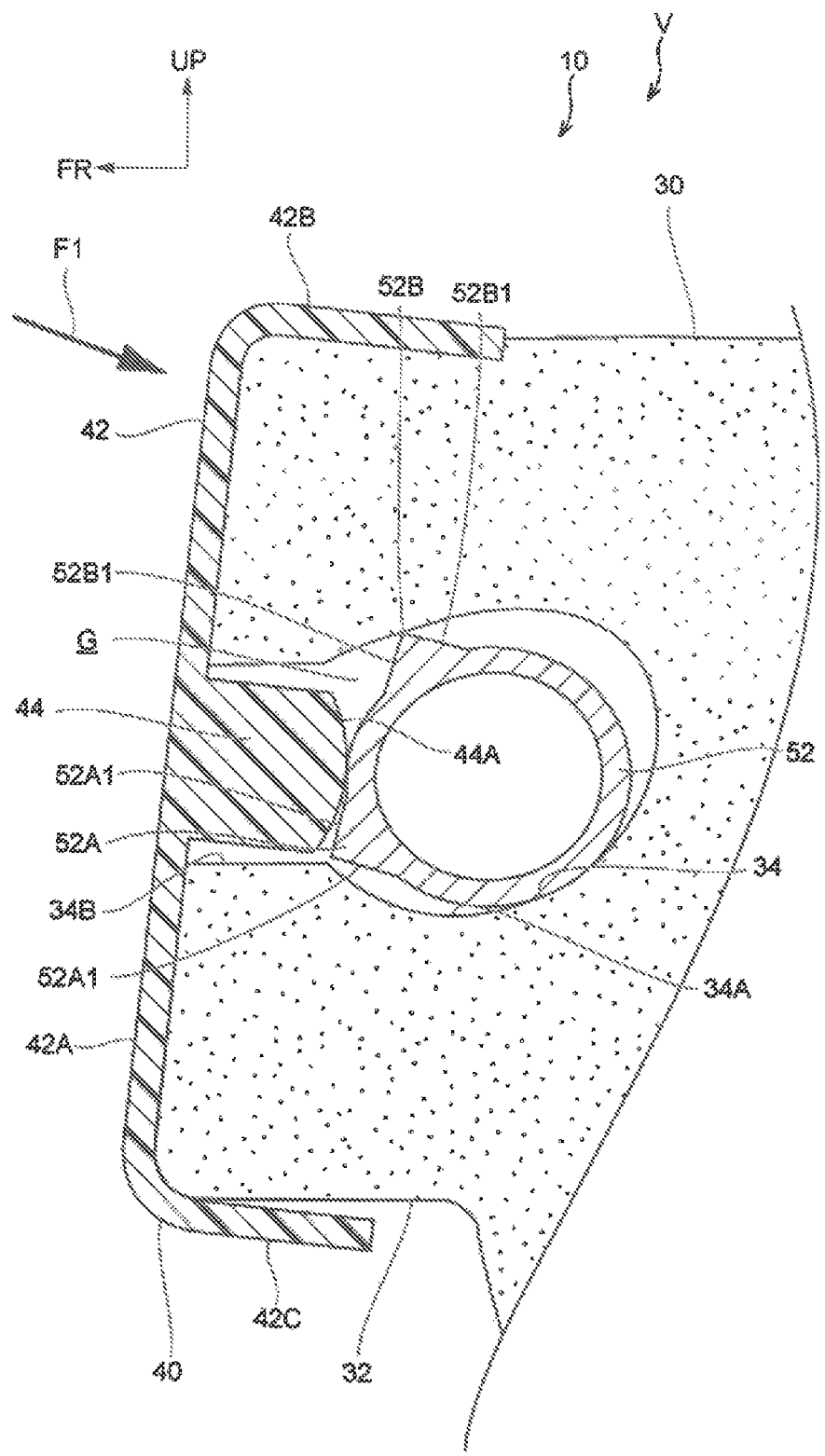
FIG. 4 is a cross-sectional diagram schematically illustrating an exemplary operation of the contact detection apparatus at the time of frontal contact between a vehicle and a human and corresponding to FIG. 3.

When the vehicle V makes frontal contact with a human, the bumper cover 64 may come into contact with the feet of the human, causing the human to fall onto the hood of the vehicle V. In this case, as illustrated in FIG. 4, a contact load F1 may be mainly applied obliquely downward in the backward direction to the bumper cover 64 and the pressing cover 40 attached to the front end (the tube holder 32) of the absorber 30. When the contact load F1 is applied to the pressing cover 40, the pressing cover 40 may be inclined obliquely downward in the backward direction and displaced in the backward direction. Thus, the pressing member 44 of the pressing cover 40 may be inclined in the backward direction inside the opening groove 34B of the absorber 30. The pressing face 44A of the pressing member 44 may be thereby brought into contact with the upper inclined surface 52A1 of the first protrusion 52A of the pressure tube 52, which presses the upper inclined surface 52A1 downward. The pressure tube 52 may be thereby rotated from the initial position to the first position.

When the pressure tube 52 is moved to the first position, the second protrusion 52B of the pressure tube 52 may be displaced from the initial position in the frontward direction while being kept adjacent to a lower side of an upper portion of the tube holder 32. As the pressing cover 40 is inclined in the backward direction, the cover body 42 of the pressing cover 40 may press mainly the upper portion of the tube holder 32 obliquely downward in the backward direction. The upper portion of the tube holder 32 may be thereby displaced obliquely upward in the backward direction, which presses the second protrusion 52B of the pressure tube 52 obliquely downward in the backward direction. As a result, the pressure tube 52 may be compressed and deformed, resulting in a change in pressure inside the pressure tube 52. The pressure sensor 54 may output a signal in accordance with the change in pressure inside the pressure tube 52 to the ECU 56. On the basis of the output signal, the ECU 56 may detect that the contact object is a human.

Figure 5:
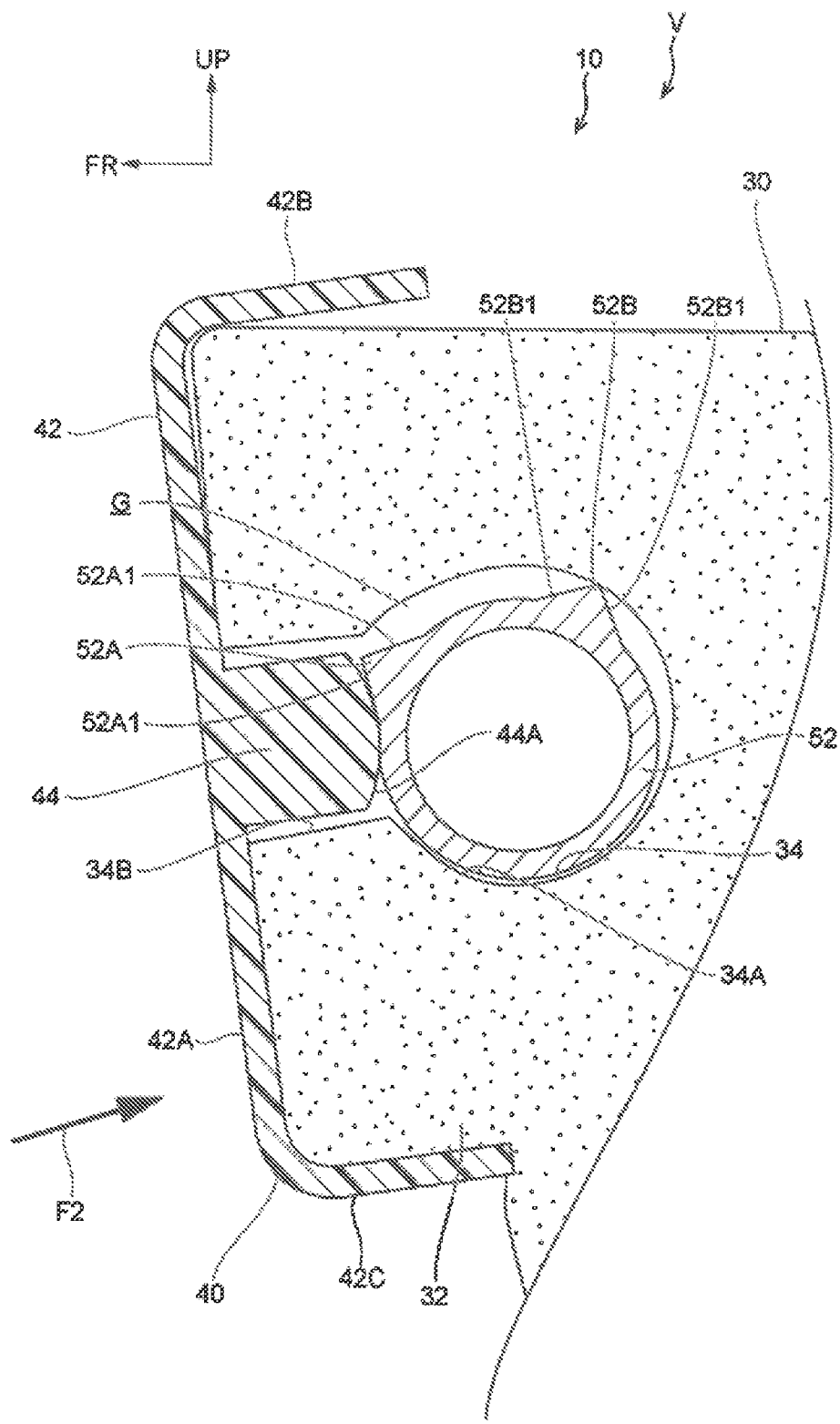
FIG. 5 is a cross-sectional diagram schematically illustrating an exemplary operation of the contact detection apparatus at the time of frontal contact between a vehicle and a contact object other than a human and corresponding to FIG. 3.

In contrast, when the vehicle V makes frontal contact with a contact object, such as a small animal, other than a human, a lower portion of the bumper cover 64 may come into contact with the contact object. In this case, as illustrated in FIG. 5, a contact load F2 may be mainly applied obliquely upward in the backward direction to the bumper cover 64 and the pressing cover 40 attached to the front end (the tube holder 32) of the absorber 30. When the contact load F2 is applied to the lower portion of the pressing cover 40, the pressing cover 40 may be inclined obliquely downward in the frontward direction and displaced in the backward direction. Thus, the pressing member 44 of the pressing cover 40 may be inclined in the frontward direction inside the opening groove 34B of the absorber 30. At this time, the pressing face 44A of the pressing member 44 may be thereby brought into contact with the lower inclined surface 52A1 of the first protrusion 52A of the pressure tube 52, which presses the lower inclined surface 52A1 upward. The pressure tube 52 may be thereby rotated from the first position to the second position.

When the pressure tube 52 is moved to the second position, the second protrusion 52B of the pressure tube 52 may be displaced from the initial position in the backward direction while being kept adjacent to the lower side of the upper portion of the tube holder 32. As the pressing cover 40 is inclined in the frontward direction, the cover body 42 of the pressing cover 40 may press mainly the lower portion of the tube holder 32 obliquely upward in the backward direction. The lower portion of the tube holder 32 may be thereby displaced obliquely upward in the backward direction. At this time, the second protrusion 52B of the pressure tube 52 may be located on an opposite side to the lower portion of the tube holder 32 with respect to the holding groove 34A. This helps to prevent the lower portion of the tube holder 32 from pressing the second protrusion 52B. Further, the gap G may be defined between the pressure tube 52 and the lower portion of the tube holder 32. This helps to prevent the lower portion of the tube holder 32 from pressing the pressure tube 52 even when the lower portion of the tube holder 32 is displaced obliquely upward in the backward direction. Accordingly, the change in pressure inside the pressure tube 52 may be small when the vehicle V makes contact with a contact object other than a human. On the basis of the small change in pressure inside the pressure tube 52, the ECU 56 may detect that the contact object is an object, such as a small animal, other than a human.

According to the contact detection apparatus 10 of the example embodiment described above, the pressure tube 52 is held in the groove 34 of the tube holder 32 which is a part of the front end of the absorber 30, and the pressing cover 40 is attached to the front end of the tube holder 32. The pressing member 44 of the pressing cover 40 is disposed inside the opening groove 34B of the groove 34 and in front of the pressure tube 52. The first protrusion 52A is provided on the outer periphery of the pressure tube 52. The first protrusion 52A projects in the frontward direction and and faces the pressing member 44 in the frontward and backward directions. An outer peripheral surface of the first protrusion 52A has the pair of the upper and lower inclined surfaces 52A1. As seen in the vehicle-width direction, the inclined surfaces 52A1 incline in respective directions so as to come closer to each other as inclined surfaces 52A1 extend in the frontward direction. Further, the second protrusion 52B is provided on the outer periphery of the pressure tube 52. The second protrusion 52B is disposed above the first protrusion 52A. As described above, upon frontal contact between the vehicle V and a human, the upper inclined surface 52A1 of the first protrusion 52A may be pressed by the pressing member 44, which rotates the pressure tube 52 from the initial position to the first position. Further, the second protrusion 52B disposed above the first protrusion 52A may be pressed by the upper portion (with respect to the groove 34) of the tube holder 32 to which the contact load F1 is mainly applied, which appropriately deforms the pressure tube 52. In contrast, upon frontal contact between the vehicle V and a contact object other than a human, the lower inclined surface 52A1 of the first protrusion 52A is pressed by the pressing member 44, which rotates the pressure tube 52 from the initial position to the second position. At this time, the second protrusion 52B may be located on an opposite side to the lower portion of the tube holder 32 with respect to the groove 34 (i.e., a portion of the tube holder 32 below the groove 34). This helps to prevent the lower portion of the tube holder 32 from pressing the second protrusion 52B. As a result, the deformation of the pressure tube 52 may be small. Accordingly, it is possible for the contact detection apparatus 10 of the example embodiment to properly detect whether a contact object in contact with the vehicle V is a human.

Further, the second protrusion 52B and the pressure tube 52 may be formed as a single component. This allows the holding groove 34A of the absorber 30 to have an oval shape. Accordingly, it is possible to improve the formability of the absorber 30.

The pressing face 44A of the pressing member 44 may be curved into an arc shape that protrudes in the backward direction as seen in the vehicle-width direction. Such a pressing face 44A may press the upper or lower inclined surface 52A1 of the first protrusion 52A to thereby rotate the pressure tube 52 from the initial position to the first or second position.

In the foregoing example embodiment, the second protrusion 52B is provided on the pressure tube 52. Alternatively, a protrusion corresponding to the second protrusion 52B may be provided on the inner periphery of the upper portion of the holding groove 34A of the absorber 30 at a position above the first protrusion 52A. In this case, the protrusion provided on the absorber 30 may be disposed adjacent to and in contact with an upper side of the pressure tube 52. In this alternative example embodiment, the position of the protrusion corresponding to the second protrusion 52B may not change even when the pressure tube 52 rotates to the first position or the second position. This facilitates setting of the second protrusion 52B at a proper position.

In the foregoing example embodiment, the second protrusion 52B may have a substantially triangular shape in side cross-sectional view; however, the cross-sectional shape of the second protrusion 52B may be set as desired. For example, the second protrusion 52B may have a semicircular shape that projects outward in a radial direction of the pressure tube 52. In this case, it is possible to reduce sliding resistance of the second protrusion 52B against the holding groove 34A generated when the pressure tube 52 rotates inside the holding groove 34A.

Note that the term "contact" used hereinabove may be used interchangeably with the term "collision". Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The invention claimed is:

1. A contact detection apparatus for a vehicle, the contact detection apparatus comprising:
    a bumper beam extending in a width direction of the vehicle;
    an absorber disposed in front of and adjacent to the bumper beam and extending in the width direction of the vehicle;
    a contact detection sensor including a pressure tube and configured to output a signal in accordance with a change in pressure of the pressure tube, the pressure tube extending in the width direction of the vehicle and being held by the absorber;
    a tube holder comprising a part of a front end of the absorber and having a groove that opens in a frontward direction of the vehicle and holds the pressure tube therein in a rotatable manner;
    a cover attached to a front end of the tube holder and comprising a body and a pressing member, the body covering a front face of the tube holder, the pressing member extending from the body in a backward direction of the vehicle and being disposed in front of the pressure tube;
    a first protrusion provided on an outer periphery of the pressure tube, projecting from the pressure tube in the frontward direction of the vehicle, facing the pressing member in the frontward direction and the backward direction of the vehicle, and having a pair of an upper inclined surface and a lower inclined surface, the upper inclined surface and the lower inclined surface inclining in respective directions to come closer to each other as the upper inclined surface and the lower inclined surface extend in the frontward direction of the vehicle as seen in the width direction of the vehicle; and
    a second protrusion provided on the outer periphery of the pressure tube or an inner periphery of the groove and disposed above the first protrusion in an upward direction of the vehicle.

2. The contact detection apparatus according to claim 1, wherein the second protrusion projects from an outer periphery of an upper end of the pressure tube in the upward direction of the vehicle.

3. The contact detection apparatus according to claim 1, wherein the pressing member has a rear end face curved into an arc shape that protrudes in the backward direction of the vehicle as seen in the width direction of the vehicle.

4. The contact detection apparatus according to claim 2, wherein the pressing member has a rear end face curved into an arc shape that protrudes in the backward direction of the vehicle as seen in the width direction of the vehicle.

* * * * *